V. E. DUNCANSON.
EYEGLASS HOLDER.
APPLICATION FILED APR. 17, 1916.

1,309,573.

Patented July 8, 1919.
2 SHEETS—SHEET 1.

WITNESSES

INVENTOR
Vincent E. Duncanson
BY
Richard B. Owen
ATTORNEY

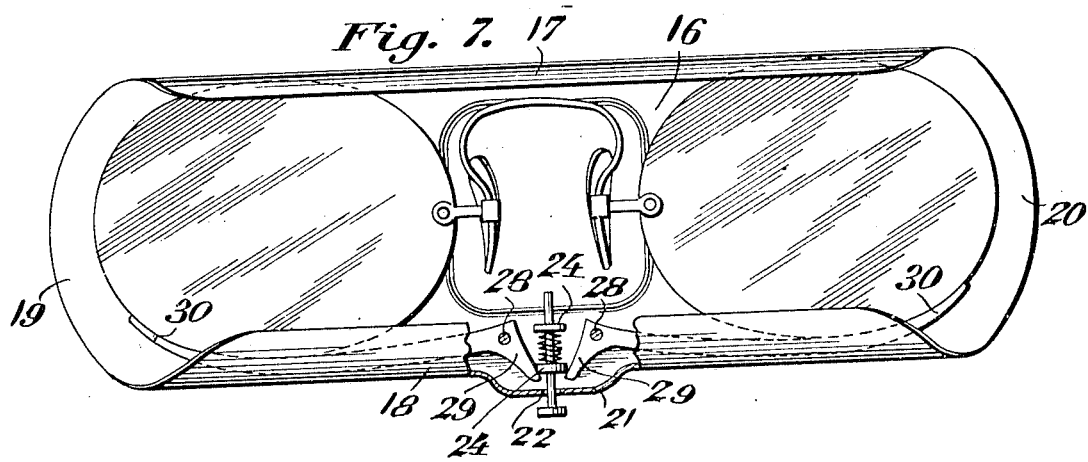
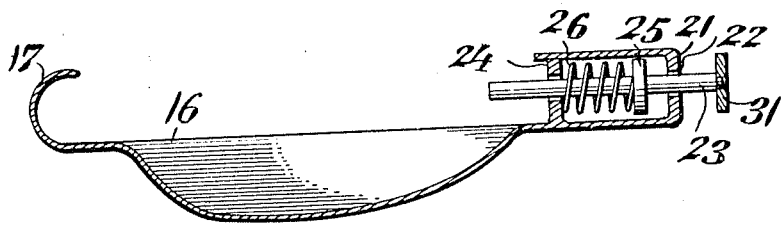
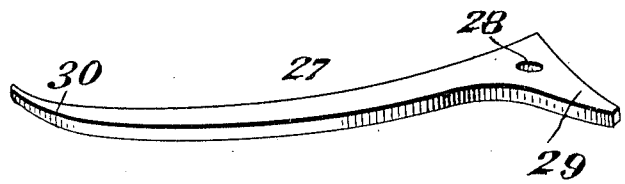

UNITED STATES PATENT OFFICE.

VINCENT E. DUNCANSON, OF LYNCHBURG, OHIO.

EYEGLASS-HOLDER.

1,309,573.  Specification of Letters Patent.  Patented July 8, 1919.

Application filed April 17, 1916. Serial No. 91,664.

*To all whom it may concern:*

Be it known that I, VINCENT E. DUNCANSON, a citizen of the United States, residing at Lynchburg, in the county of Highland and State of Ohio, have invented certain new and useful Improvements in Eyeglass-Holders, of which the following is a specification.

This invention has relation to eyeglass holders and the nature and objects thereof will be readily apparent to those skilled in the art to which it appertains, in the light of the following explanation of the accompanying drawings, illustrating what I now believe to be the preferred embodiment, or mechanical expression of my invention from among other forms and arrangements within the spirit thereof and the scope of the appended claims.

However, an object of the invention is to provide an eyeglass holder without a cover, and with means for securely retaining a pair of eyeglasses therein for quick removal when the glasses are required to be used.

Another object of the invention is to provide an eyeglass holder of the character described, which is simple in its construction and adapted for manufacture at a low cost.

In addition to the foregoing my invention comprehends improvements in the details of construction and arrangement of parts to be hereinafter described, and particularly pointed out in the appended claims.

Figure 1:
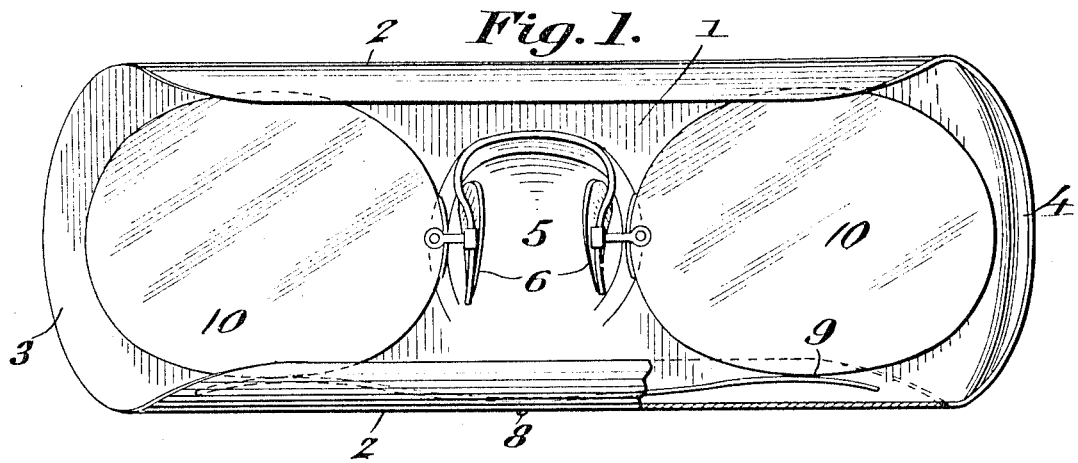
Figure 2:
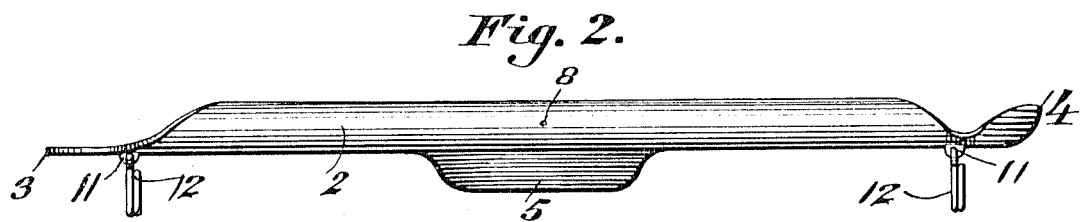
Figure 3:
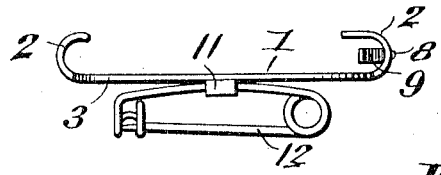
Figure 4:
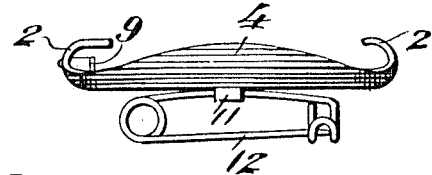
Figure 5:
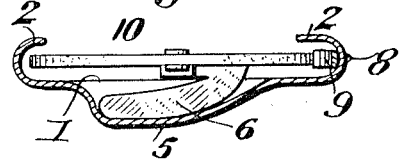
Figure 6:
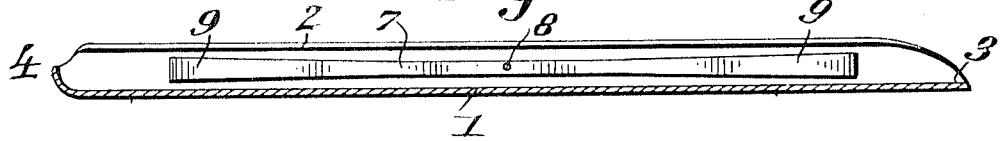

In the accompanying drawings in which similar and corresponding parts are designated by the same characters of reference throughout the several views in which they appear;

Figure 1, is a plan view of one form of an eyeglass holder constructed after the manner of my invention, Fig. 2, is a side elevation thereof, Figs. 3 and 4, are end views of the holder, Fig. 5, is a medial transverse section, Fig. 6, is a longitudinal section, Fig. 7, is a plan view partly in section of a modified form of my invention, Fig. 8, is a transverse section through the form shown in Fig. 7, Fig. 9, is a detail perspective view of one of the eyeglass retaining members, With reference to the drawings 1 indicates the holder comprising a single piece of sheet metal, celluloid, or other suitable material, somewhat elongated in conformation and having its longitudinal edges curved toward each other as at 2.

The ends 3 and 4 of the holder are rounded, and the end 4 is slightly turned up to form an abutting edge to prevent the entire passage of the glasses through the holder. A depressed portion 5 is formed centrally of the holder to receive the guards of the glasses. A flat spring member 7 is secured at its intermediate portion to the holder at 8 within one of the curved edges thereof, and is provided with terminals 9 which are somewhat spaced from the inner edge of the rounded portion, to engage the lenses 10 of a pair of eyeglasses.

With reference to Fig. 1 the position of the eyeglasses within the holder is clearly illustrated, and it will be noted that the glasses may be removed by sliding them longitudinally toward the end 3 which is in the same place with the bottom of the holder.

On the under side of the holder, and at opposite ends are ears 11 apertured for the reception of fasteners 12, preferably in the form of safety pins which may be gold plated or otherwise made ornamental to please the eye. The holder may thus be worn upon the outside of the clothing by securing the same to the coat or waist, and the glasses contained therein are thus readily accessible and within view when not in use.

In Fig. 7 of the drawings I have illustrated a slightly modified form of holder which comprises a body portion 16 similar to the body portion of the holder just described, and having curved longitudinal edges 17 and 18, the edge 18 however, being extended toward the center to a somewhat greater distance than the edge 17 for the purpose of inclosing retaining mechanism to be presently described. The ends 19 and 20 are rounded and lie in the same plane at the body of the holder, consequently the glasses may be inserted in this holder from either end.

The edge 18 is formed centrally with an outwardly bulged portion 21 formed with an aperture 22 through which passes a pin 23 mounted for sliding movement in an apertured lug 24 projecting upwardly from the body of the holder. A flange 25 is formed on the pin, and a coil spring 26 embraces the pin and is disposed between the lug 24 and the flange 25. Retaining fingers 27 of which two are provided are mounted for pivotal engagement upon studs 28 at either side of the pin 23, and are formed with substantially right angular extensions 29 for engagement with the flange 25 of the pin. The opposite terminals 30 of the members 27 are curved to conform to the edges of the eyeglass lenses and thus are enabled to retain the glasses in a more positive manner than is possible by the use of the single piece resilient member before described.

The extensions 29 are disposed in such relation to the pivots 28 that the engagement of the flange 24 under the influence of the spring tends to normally maintain the terminals 30 in close contact with the lenses of the eyeglasses to positively preclude displacement of the glasses from the holder.

From the foregoing it is apparent that I have provided an eyeglass holder in several forms which may be manufactured at a low cost, and which will be a great convenience for persons having to wear spectacles or eyeglasses. Various ways of constructing my invention will occur to those skilled in the art, and I therefore reserve the right and privilege of changing the form of the details and otherwise altering the arrangement of parts without departing from the spirit of the invention or the scope of the appended claims.

Having thus described my invention what I claim as new and desire to secure by Letters Patent is:—

1. A holder for eyeglasses comprising a substantially flat body portion formed of a single piece of material and having inwardly turned longitudinal edges spaced apart from each other and adapted to form recesses for the reception of the edges of the eyeglasses, and resiliently held members within one of the recesses for engaging and holding said eyeglasses.

2. A holder for eyeglasses comprising a flat body portion having its longitudinal edges curved and directed toward each other to form longitudinal recesses, fingers pivotally connected at one of their terminals to the holder at an intermediate portion thereof and having right angular extensions adjacent their point of connection, and resilient means engaging the extensions for maintaining the free ends of the fingers in engagement with the lenses.

3. A holder for eyeglasses comprising a substantially flat body portion formed of a single piece of material and having its longitudinal edges spaced apart and turned and directed toward each other to form recesses to receive and hold said eyeglasses, fingers pivoted within one of said recesses for engaging said eyeglasses and resilient means for retaining the fingers in engagement with said eyeglasses.

4. A holder for eyeglasses comprising a flat body portion having curved longitudinal edges which are directed toward each other, to form recesses, fingers having adjacent ends pivotally connected to the holder within one of the recesses and at an intermediate portion thereof, right angular extensions on the fingers adjacent their point of pivotal connection and directed toward each other, a pin slidably mounted for movement within an aperture formed in one curved edge, a lug formed with an aperture for guiding the pin, a flange on the pin for engaging both of the extensions to urge the free terminals of the fingers in engagement with the lenses, a coil spring embracing the rod and disposed between the lug and the flange, and a button on the terminal of the pin outside the holder.

5. A holder for eyeglasses comprising a body portion formed of a single piece of material having a depressed portion to receive the nose guards of the glasses and curved longitudinal edges spaced apart and directed toward each other to form recesses, fingers pivoted at one of their terminals to the holder within one of said recesses and having their free ends oppositely extended, a rectangular extension on each finger adjacent its point of connection, a pin slidably mounted within the recess and between the ends of the fingers, a flange on the pin in engagement with the extensions and a coiled spring for urging the flange into such engagement.

In testimony whereof I affix my signature in presence of two witnesses.

VINCENT E. DUNCANSON.

Witnesses:
 HELEN PULSE,
 JOSIE PULSE.